United States Patent [19]
Taylor

[11] 3,986,729
[45] Oct. 19, 1976

[54] CONNECTING APPARATUS

[75] Inventor: William M. Taylor, Houston, Tex.

[73] Assignee: Cameron Iron Works, Inc., Houston, Tex.

[22] Filed: Aug. 11, 1975

[21] Appl. No.: 603,326

[52] U.S. Cl. .................................... 285/18; 166/.5
[51] Int. Cl.² .......................................... F16L 35/00
[58] Field of Search ..................... 166/.5, .6, 182; 285/18, 4, DIG. 21, 24, 27, 141, 321, 316, 379, 334.2, 3, 319, 421, 105

[56] References Cited
UNITED STATES PATENTS

| | | | |
|---|---|---|---|
| 3,096,999 | 7/1963 | Ahlstone | 285/24 |
| 3,222,088 | 12/1965 | Haeber | 285/18 |
| 3,240,511 | 3/1966 | Bishop et al. | 285/18 |
| 3,273,915 | 9/1966 | Bishop et al. | 285/18 |
| 3,393,926 | 7/1968 | Arnold | 285/18 |
| 3,489,436 | 1/1970 | Ahlstone | 285/18 |
| 3,741,589 | 6/1973 | Herd et al. | 285/3 |

Primary Examiner—G. V. Larkin
Attorney, Agent, or Firm—W. F. Hyer; Marvin B. Eickenroht

[57] ABSTRACT

There are disclosed two embodiments of an apparatus for releasably connecting with one end of a member at an underwater location, wherein the member has a seating surface which faces toward its one end and a conical locking shoulder which faces away from its one end. The apparatus comprises a body having a seating surface engageable with the seating surface on the member, and a circumferentially discontinuous locking ring carried by the body and having a conical locking surface which is circumferentially expandible and contractible to permit it to be moved past a portion of the member into a position radially opposite the locking shoulder, as the seating surfaces are so engaged, and remotely operable means which is mounted on the body for movement in one direction to force the locking ring to locking position with respect to the locking shoulder and in the opposite direction to permit the locking ring to return to unlocking position with respect to the shoulder. In one embodiment, a normally expanded locking ring is carried by the body for contraction into locking engagement with an external shoulder about the outer side of a member, and, in another embodiment, a normally contracted locking ring is carried by the body for expansion into locking engagement with respect to a shoulder in the bore of a member.

13 Claims, 12 Drawing Figures

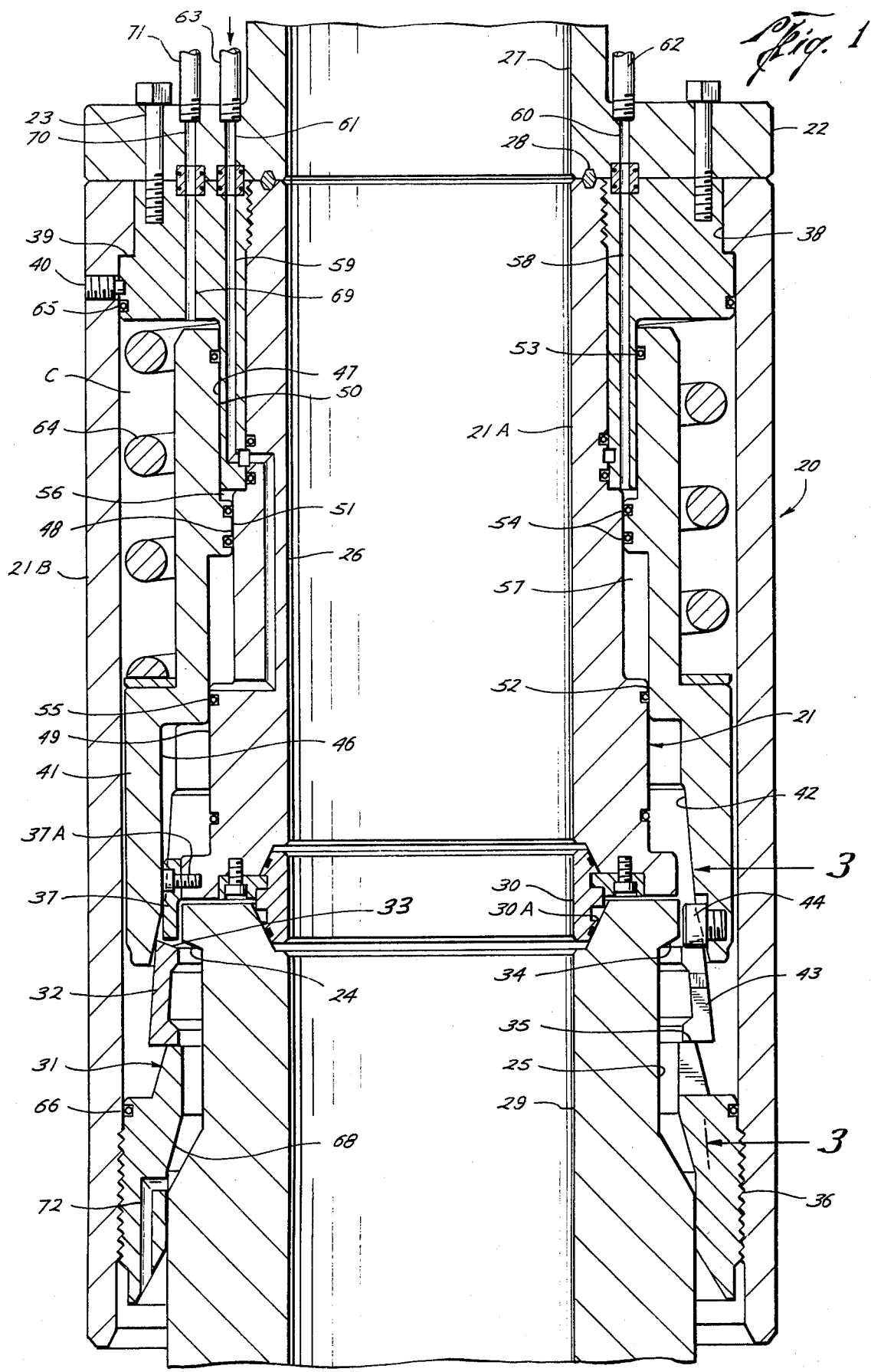

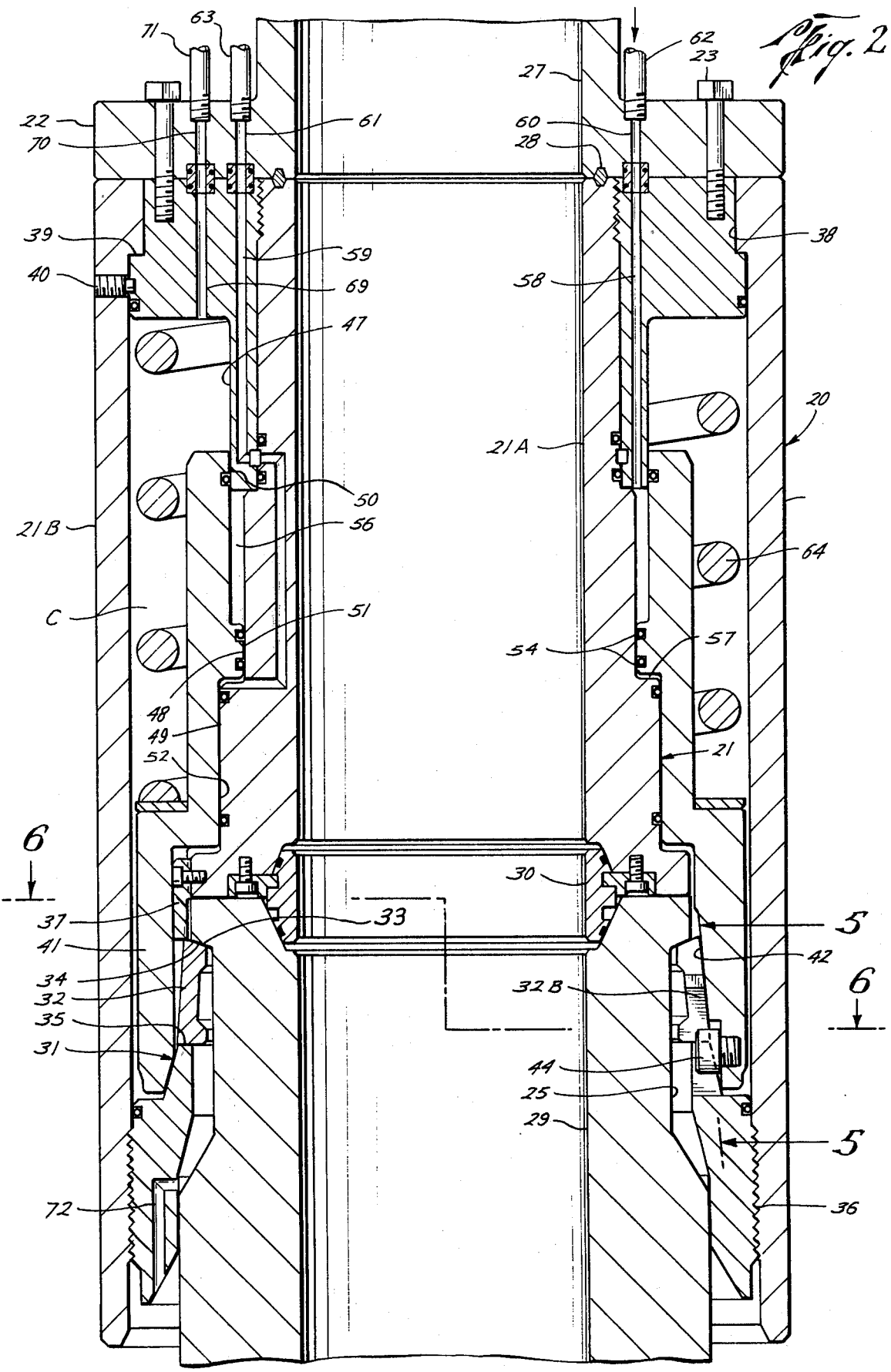

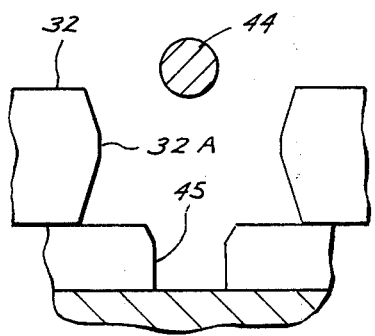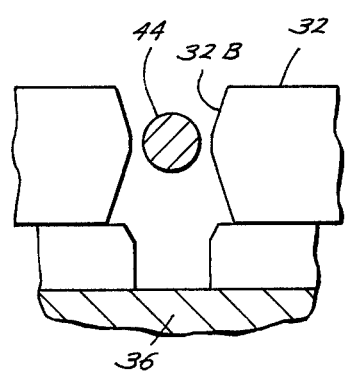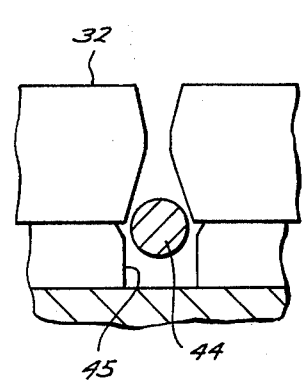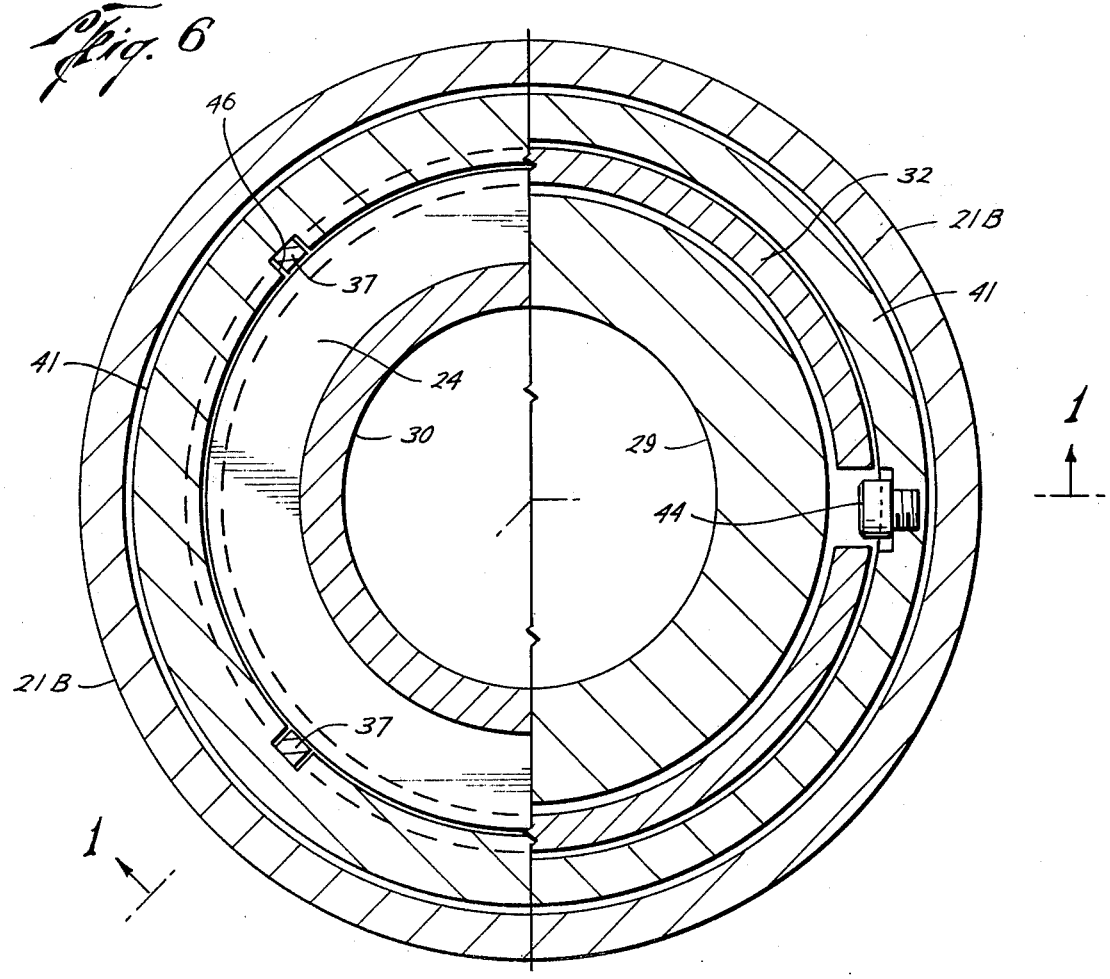

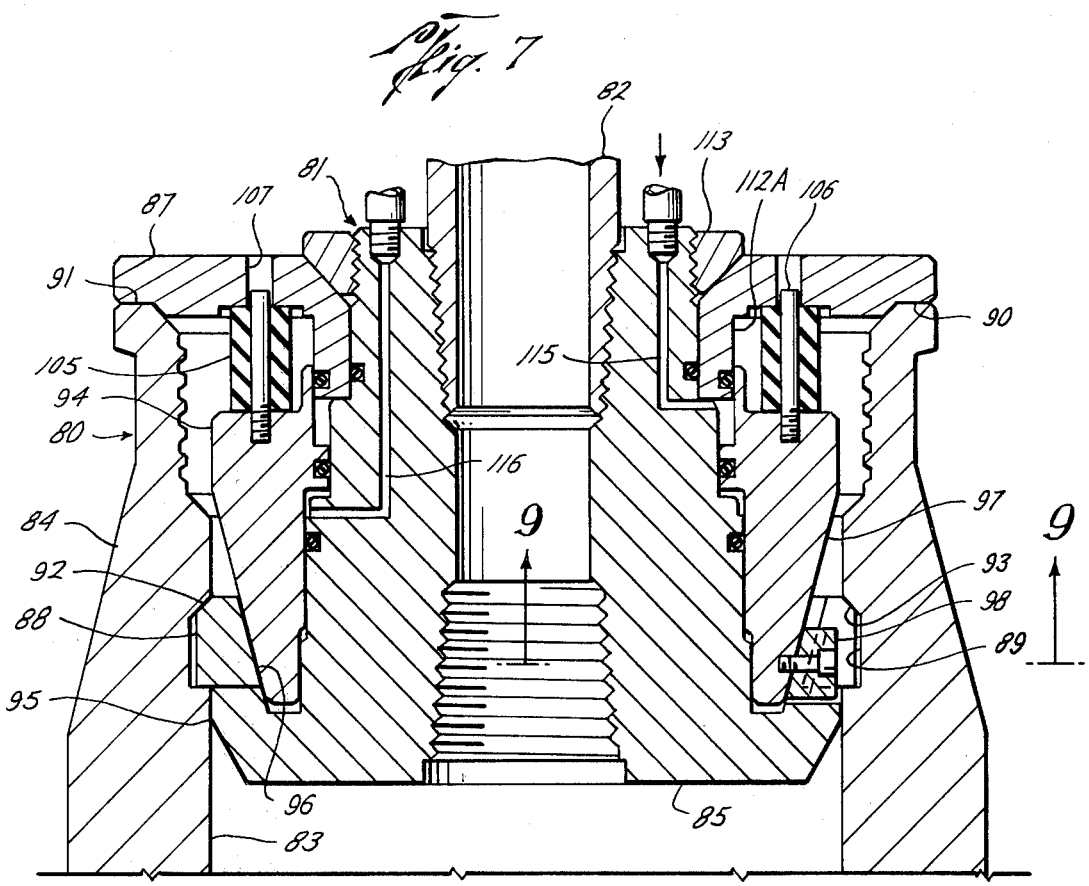
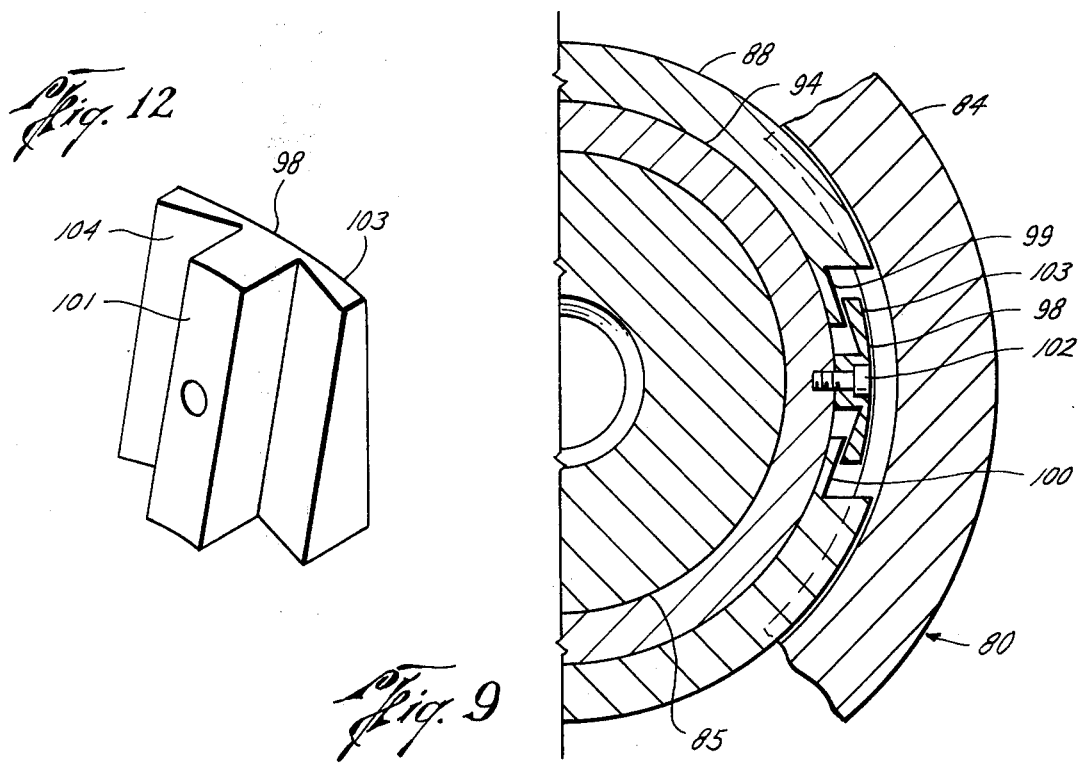

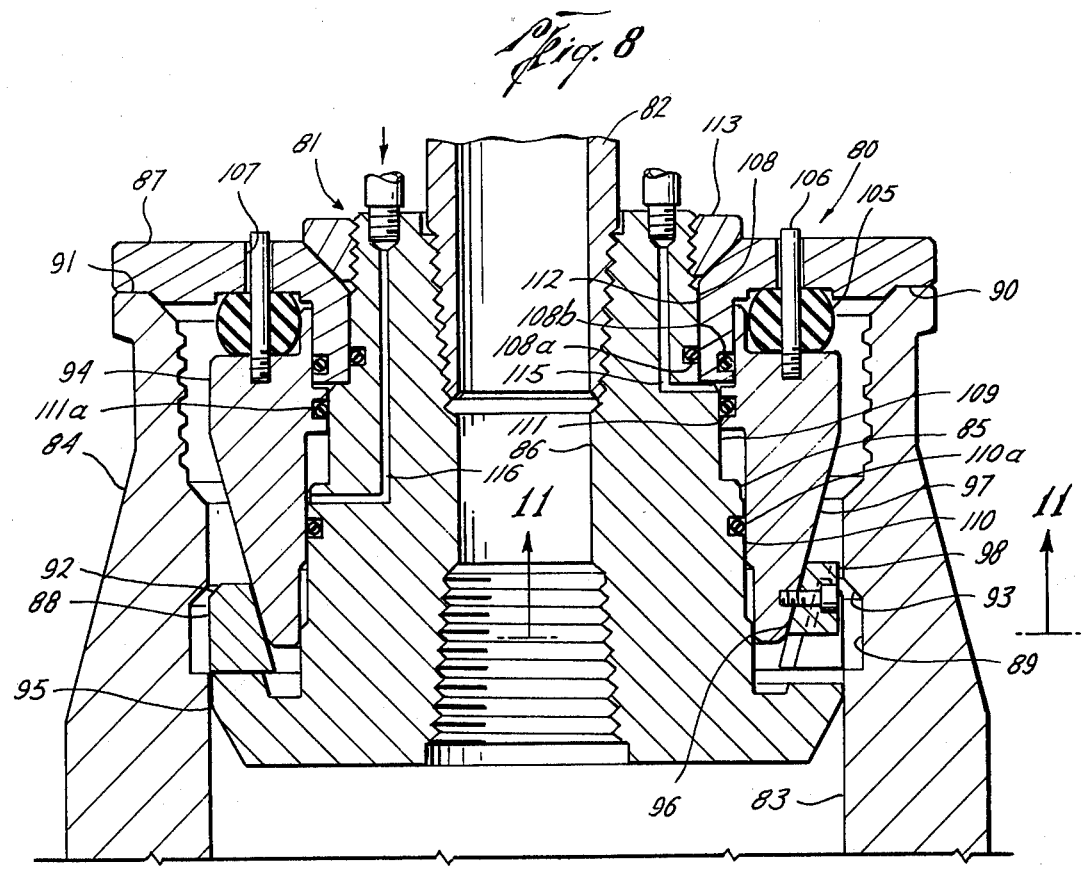
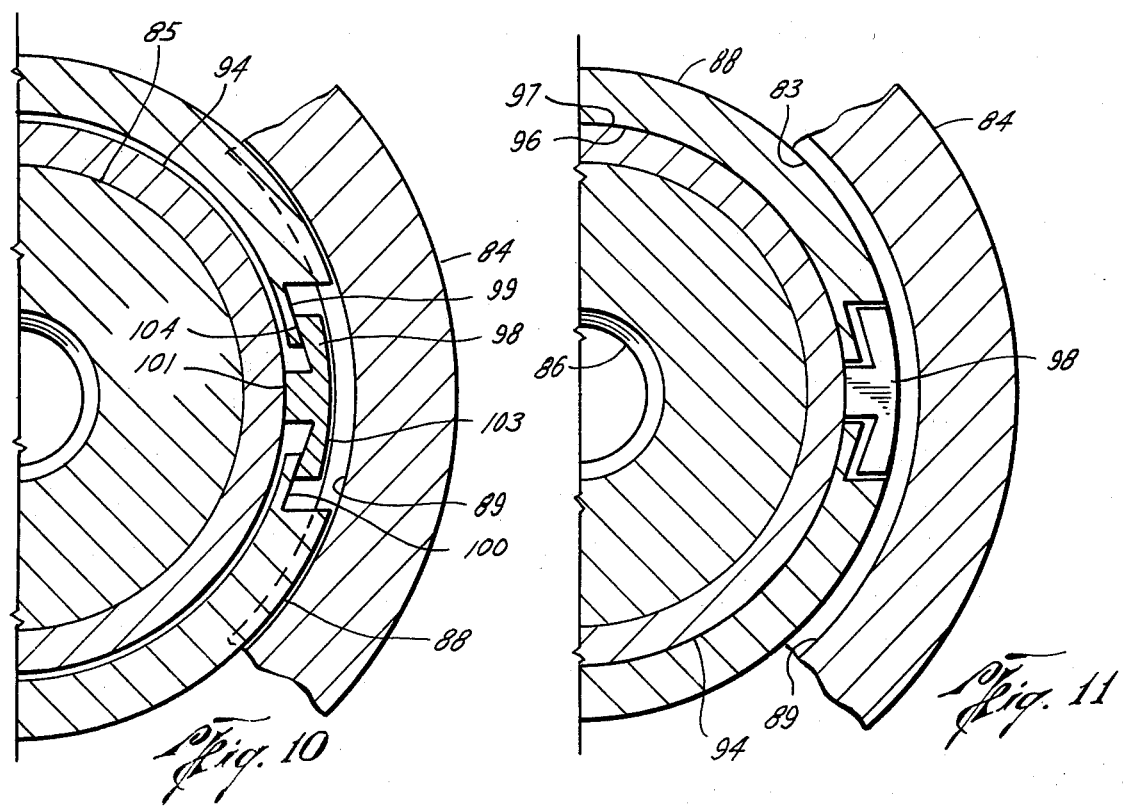

CONNECTING APPARATUS

This invention relates to apparatus for releasably connecting with one end of a member at an underwater or other remote location. More particularly, it relates to improved apparatus of this type for releasably connecting with a member which has a seating surface which faces toward its one end and a conical locking shoulder which faces away from its one end, wherein such apparatus comprises a body carrying locking means which is circumferentially expandable and contractible to permit it to be moved between a first circumferential position in which it may be moved past a portion of the member into a position radially opposite the locking shoulder, as the seating surfaces are engaged, and a second circumferential position in which it slidably engages the locking shoulder on the member so as to draw seating surfaces on the body and member into tight engagement.

U.S. Pat. No. 3,096,999 shows one such apparatus in which the locking means comprises a series of locking dogs carried about the body for swinging between locking and unlocking positions in response to vertical reciprocation of a sleeve having an inner cam surface disposed about outer cam surfaces on the dogs. Thus, as shown in such patent, the locking sleeve is suspended from rods which may be remotely actuated to lower the sleeve and thereby force the dogs into locking position, or raise the sleeve to cause its upper end to engage outwardly projecting parts on the dogs and thereby swing the dogs into unlocking position.

As shown in the aforementioned patent, the seating surface on the downwardly and inwardly tapered side of a gasket on the end of the body is guidably lowerable onto a similarly tapered seating surface about the upper end of a bore through the remotely located member. The seating surface of the gasket is initially of a steeper taper than that of the wellhead member so that it is deformed or sprung inwardly as the locking dogs draw the surfaces together. When the members are connected in this manner, considerable force is required to break the sliding engagement between the dogs and the locking shoulder in order to move the dogs to unlocking position, especially when there is corrosion or accumulation of debris between them.

The apparatus may be connected to the lower end of equipment for use in lowering it from above water level into connection with the member located beneath the water level; and, as illustrated in the aforementioned patent, the locking means is held in unlocking position until it has been lowered onto such member, and then locked thereto. When it is then desired to retrieve the equipment, the locking means is again moved to and held in unlocking position to permit it to be lifted from the underwater member. On the other hand, the apparatus may be first connected to the member above water, in order to lower it beneath the water surface, and then disconnected therefrom at the underwater level. This may be desirable, for example, when a blowout preventer is to be lowered onto an underwater wallhead by means of a riser pipe, whereby the connecting apparatus serves to releasably connect the lower end of the riser pipe with the upper end of the blowout preventer.

In any event, the connection or disconnection, as the case might be, is made with the apparatus remote from the water level. In view of the increasing depths at which wells are now drilled and completed, it has been proposed, in an improved version of the apparatus shown in the prior patent, to reciprocate the locking sleeve by means of actuators connecting the body to the locking ring and supplied with hydraulic fluid through fluid lines extending to a source of the fluid above the water level. Due to the large force required to unlock the apparatus, the unlocking pressure responsive areas of these actuators are greater than the locking areas thereof.

In order to prevent premature unlocking of the locking means, and thus dropping the blowout preventer or other equipment connected to the apparatus for lowering therewith, it has been the practice, in the use of such apparatus, to maintain the hydraulic fluid under pressure on the locking area. However, it may be necessary to lower the blowout preventer or other equipment several hundred feet from the deck of a drilling platform to the water surface, prior to lowering it beneath the water surface to the underwater wellhead. Thus, if the operating pressure were to be lost, either by failure of the lines connecting the actuator to the source of operating fluid on the platform, or due to error of operating personnel in maintaining operating pressure on the locking surfaces, the hydrostatic pressure of the hydraulic fluid in the lines could be sufficient to force the actuator to unlocking position, thereby dropping the preventer or other equipment being lowered.

Although the above-described apparatus was a substantial improvement over the prior art, it is relatively expensive, due primarily to the cost of manufacturing the locking dogs, and it is therefore an object of this invention to provide apparatus of this type having less expensive locking means.

Another object is to provide such apparatus in which hydraulic operating pressure need not be held on the actuator locking surfaces to maintain the apparatus locked as it is lowered therewith to such remote location.

In accordance with one novel aspect of the present invention, the first-mentioned object is accomplished by apparatus wherein the locking means comprises a circumferentially discontinuous locking ring carried by the body for movement between a normally assumed, first circumferential unlocking position, and a second circumferential locking position, and the remotely operable means carries means for engaging surfaces on the discontinuous ends of the ring so as to force the ring out of its locking position, and thereby permit it to move to its unlocking position in the event the conical locking surface thereon sticks to the conical locking shoulder on the member as the remotely operable means moves in an unlocking direction. As will be appreciated, a locking ring of this construction is much less expensive to manufacture than the locking dogs of the prior apparatus, and, at the same time, insures that the ring is free to assume its normal unlocking position despite corrosion or debris between the conical locking surface and conical locking shoulder on the member.

In one emdobiment of the invention, the apparatus is adapted to be releasably connected to a member in which the locking shoulder is disposed about an outer portion thereof. Thus, the lockiing ring is carried by an inner portion of the body for movement between a normally expanded position in which it may be moved over the outer portion of the member for disposal radially opposite the locking shoulder, and a contracted locking position. In this one embodiment of the invention, the means carried on the remotely operable means for engaging surfaces on the ends of the locking ring comprises a pin movable between the ends for spreading them as the remotely operable means is moved in said opposite direction.

In another embodiment of the invention, the apparatus is adapted to be releasably connected to a member in which the locking shoulder is disposed about an inner portion thereof. Thus, the locking ring is carried by an outer portion of the body for movement between a normally assumed contracted position in which it may be moved through the inner portion of the member for disposal radially opposite the locking shoulder, and an expanded locking position. In this other embodiment of the invention, the means carried on the remotely operable means for engaging surfaces on the discontinuous ends of the locking ring comprises a "T"-shaped member having flanges which overlap flanges on the ends of the locking ring so as to draw them together as the remotely operable means moves in the opposite direction.

In both embodiments of the invention, the remotely operable means comprises an axially movable sleeve which is slidable over the locking ring. Thus, in the first-mentioned embodiment of the invention, the sleeve slides over the outer surface of the locking ring to urge it to its contracted locking position, and in the second-mentioned embodiment, the sleeve slides over an inner surface of the locking ring to urge it to its expanded locking position. The sleeve is reciprocated in an axial direction by piston means thereon sealably slidable over the body to provide annular pressure chambers therebetween, and passageways are formed in the body to connect with the chambers in order to permit operating fluid from a remote source to be selectively introduced into or withdrawn from each.

In accordance with another novel aspect of the invention, the second-mentioned object of the invention is accomplished by apparatus which includes spring means arranged to urge the sleeve to locking position, and piston means which provides a first pressure responsive area for moving the sleeve to locking position which is smaller than a second pressure responsive area for moving the sleeve to unlocking position. During normal operation of the apparatus, wherein hydraulic fluid may be applied to the larger pressure responsive area of the piston means for moving the locking ring to unlocked position in order to disconnect the apparatus from the member, the opposing force of the spring is a relatively minor factor. However, when the apparatus is instead used for locking the equipment to the member in order to lower it therewith, the spring provides a force to hold the sleeve in locking position, even though there is no operating pressure in either pressure chamber and despite the existence of hydrostatic heads of hydraulic fluid in the fluid lines which otherwise would cause a predominant force in an unlocking direction. Consequently, the member may be lowered from a drilling platform toward the water surface above an underwater wellhead with the assurance that it will not be dropped due to inadvertent disconnection of the apparatus.

In the first-mentioned embodiment of the invention, the body includes an outer housing which encloses the locking ring and sleeve, piston means, and spring means within a chamber from which seawater may be purged to protect such parts from the corrosive effects of seawater. As will be appreciated, the concentric arrangement of the locking ring and sleeve, piston means and housing provide apparatus which is, because of its relatively small cross-sectional area, especially well suited to being run through riser pipes or other confined conduits.

In the drawings:

FIG. 1 is a vertical sectional view of the first-mentioned embodiment of apparatus constructed in accordance with the present invention, as seen along broken line 1—1 of FIG. 6, with the apparatus landed upon the underwater member, and with the locking ring thereof in unlocking position with respect to such member;

FIG. 2 is a vertical sectional view of the apparatus, similar to FIG. 1, but with the locking ring in locking position;

FIGS. 3, 4 and 5 are elevational views of a portion of the outer side of the locking ring of the apparatus, with FIG. 3 being seen from the position of broken line 3—3 of FIG. 1 and FIG. 5 being seen from the position of broken line 5—5 of FIG. 2, showing the location of the ring expanding pin carried on the locking sleeve during movement of the locking sleeve between the unlocking position of FIG. 1 to the locking position of FIG. 2;

FIG. 6 is a cross-sectional view of such apparatus, as seen along broken line 6—6 of FIG. 2;

FIG. 7 is a vertical sectional view of the second-mentioned embodiment of apparatus constructed in accordance with the present invention, with the apparatus landed upon the underwater member, and with the locking ring thereof in locking position with respect thereto;

FIG. 8 is a view similar to FIG. 7, but with the sleeve of the apparatus raised and the locking ring moved to its retracted, unlocking position;

FIG. 9 is a partial cross-sectional view of the apparatus and member with the locking ring in locking position, as seen along broken line 9—9 of FIG. 7;

FIG. 10 is a partial cross-sectional view similar to FIG. 9, but upon initial upward movement of the sleeve;

FIG. 11 is another cross-sectional view of the apparatus and member, similar to FIGS. 9 and 10, but upon full upward movement of the sleeve to permit the locking ring to move to unlocking position, as seen along broken line 11—11 of FIG. 8; and FIG. 12 is an enlarged perspective view of the T-shaped member carried by the sleeve.

With reference now to the details of the above-described drawings, the first-mentioned embodiment shown in FIGS. 1 to 6, and indicated in its entirety by reference character 20, includes a body 21 having an upper end releasably connected to a flange on the lower end of equipment 22 by bolts 23, and a lower end supported on a flange 24 on the upper end of a member 25. As will be described below, when so supported, the lower end of body 21 may be releasably locked to the member, as shown in FIG. 2, or unlocked therefrom, as shown in FIG. 1.

The body 21 is connected to equipment 22 with a bore 26 therethrough aligned with a bore 27 through such equipment, and with a seal ring 28 sealably engaged with their adjacent ends. In like manner, the lower end of body 21 is adapted to be locked to the upper end of member 25 with its bore 26 aligned with a bore 29 through such member, and with their adjacent ends sealed with respect to one another by means of a gasket 30 carried on the lower end of the body. As shown, the gasket is carried on the inner circumference of the body for sealing with a seating surface 30A on the inner circumference of bore 29 so as to provide a generally smooth continuation of the bores 26 and 29.

In a typical installation, equipment 22 to which body 21 is connected may be a blowout preventer, and the member 25 may be an underwater casing head. In this case, of course, the blowout preventer is connected to apparatus such as a riser pipe (not shown) for lowering therewith into connection with the casing head. Alternatively, equipment 22 may comprise a riser pipe and the member 25 a blowout preventer adapted to be lowered with the riser pipe into connection with another wellhead member (not shown). When the apparatus is used in this latter manner, body 21 would be locked to the blowout preventer as it was so lowered, and then unlocked therefrom to permit it to be raised with the riser pipe upon connection of the preventer to the underwater wellhead member. In any event, the equipment would be guided into landed position by conventional guide lines (not shown) extending from the underwater wellhead to a drilling platform above the water level.

As shown, body 21 includes an inner housing 21A through which bore 26 extends, and a skirt 31 which extends axially downwardly from the lower end of the inner housing. The skirt has an inner diameter somewhat larger than the outer diameter of flange 24 and arranged concentrically of the bore 26 so as to permit the skirt to move past the outer edge of the flange as the body is moved into or out of landed position thereon. The skirt comprises circumferentially spaced upper skirt parts 37 secured about the lower end of the inner housing by means of screws 37A, and a lower tubular skirt part 36 carried by an outer housing 21B of the body which is supported by and extends downwardly from the upper end of inner housing 21A. The lower ends of upper parts 37 are spaced above the upper ends of lower part 36 to form an annular guideway 35 therebetween, and a circumferentially discontinuous locking ring 32 is carried within the guideway for radial movement between an outer unlocking position and an inner locking position.

Ring 32 is so formed that it normally assumes a circumferentially expanded unlocking position (FIG. 1) in which its inner diameter is substantially axially aligned with the inner diameter of skirt 31. In its unlocking position, the oppositely facing discontinuous ends 32A and 32B of the ring are sufficiently spaced apart to permit the ring to be moved inwardly to locking position (FIG. 2) in which a conical locking surface 33 on its upper end tightly engages a conical locking shoulder 34 on the lower side of flange 24, so as to draw the seating surface of the lower end of gasket 30 tightly against the seating surface 30A of the upper side of flange 24. As can be seen from a comparison of FIGS. 1 and 2, the deflection of the gasket permits the lower end of the inner housing 21A which is arranged about gasket 30 to be drawn into engagement with the upper end of flange 24 arranged about seating surface 30A so as to limit further deflection thereof.

As shown, the upper end of inner housing 21A is enlarged and has a shoulder 39 thereabout upon which a flange 38 on the upper end of outer housing 21B is supported, and one or more screws 40 extend through the housing into holes in the upper end of the inner housing to fix the outer housing against rotation with respect thereto. The lower skirt part 36 is threadedly connected to the lower end of outer housing 21B, and fits closely over the outer diameter of member 25. Thus, the inner and outer housings form an annular chamber C which is closed at its upper end by the enlarged upper end of the inner housing and at its lower end by lower skirt part 36.

The locking ring is moved from unlocking to locking position by means of a sleeve 41 which surrounds intermediate portions of the inner housing and skirt within chamber C. As will be understood from a comparison of FIGS. 1 and 2, the locking sleeve is vertically or axially reciprocable and has a downwardly and outwardly tapered cam surface 42 on its inner side which is slidable downwardly over a similarly tapered surface 43 on the outer side of the locking ring. Thus, as shown in FIG. 2, when the sleeve moves downwardly to its lower limit, the camming surface 42 on its inner side will have forced the locking ring inwardly to the locking position of FIG. 2. On the other hand, when the sleeve moves upwardly, its cam surface 42 will permit the locking ring to move radially outwardly to unlocking position.

However, it may be found that the locking surface of the locking ring is stuck to the locking shoulder of flange 24, and the tendency of the locking ring to assume its unlocking position is not sufficient to break them apart. In accordance with the present invention, and as previously described, a pin 44 is carried on the inner side of the sleeve 41 in position to move between the ends 32A and 32B of the ring 32 so as to spread them and thereby circumferentially expand the locking ring as the sleeve moves upwardly from the locking position of FIG. 2 to the unlocking position of FIG. 1. It has been found that the ends of the ring need only be spread a small amount in order to overcome the frictional force with which the upper locking surface 33 of the ring and the lower locking surface 34 of the flange 24 are engaged, after which the tendency of the ring to assume its expanded position will cause it to continue to expand as the sleeve continues upwardly. Thus, it will be understood that the upper end of the pin 44 will, during its initial upward movement with the sleeve 41 from the position of FIG. 5 to that of FIG. 4, merely break the ring loose from the flange, and thus permit its ends to spread apart as the pin 44 continues to move upwardly between them, as illustrated in FIGS. 3 and 4.

As best shown in FIGS. 3 and 5, the pin 44 and ends 32A and 32B of the locking ring are so arranged that the pin will be intermediate the ends of the ring in both the locking and unlocking position of the sleeve. In this way, the pin will serve to maintain orientation of the sleeve in a circumferential sense with respect to the locking ring, and thus prevent it from assuming a position other than aligned with some portion of the space between the ends. As also shown, the lower portions of the ends 32A and 32B of the ring are tapered downwardly and outwardly so as to facilitate their being spread as the pin 44 moves upwardly into engagement with them, and the upper end of skirt part 36 is recessed at 45 to permit the lower end of the pin 44 to move into it when the sleeve is moved downwardly to locking position. The inner side of sleeve 41 is provided with longitudinal slots 46 receiving the upper skirt parts 37 so as to maintain circumferential orientation of the sleeve 41 with respect to the body 21.

The sleeve is reciprocated between locking and unlocking position by piston means on the upper end thereof sealably slidable over the inner housing of body 21. Thus, as shown, the outer surface of the inner housing intermediate its enlarged upper and lower ends is provided with upper, intermediate and lower seal diameters 47, 48 and 49, respectively, and the inner surface of the piston means on the sleeve 41 is provided with corresponding inner seal diameters 50, 51 and 52. More particularly, as shown, upper piston seal diameter 50 carries a seal ring 53 sealably slidable over body seal surface 47, intermediate piston seal diameter 51 carries seal rings 54 sealably slidable over body seal surface 48, and body seal surface 49 carries a seal ring 55 over which lower piston seal diameter 52 is sealably slidable. Thus, the piston, the inner housing of the body and the seal rings form an upper pressure chamber 56 and a lower pressure chamber 57, the lower chamber having a piston surface therein of greater cross-sectional area than the piston surface within the upper chamber 56.

Hydraulic fluid is supplied to or removed from the upper chamber 56 by means of a passageway 58 extending downwardly within the inner housing of body 21, and hydraulic fluid is supplied to or removed from the lower pressure chamber by means of a passageway 59 extending downwardly through the housing. In the preferred and illustrated embodiment of the invention, the passageways 58 and 59 are aligned and sealed with respect to passageways 60 and 61, respectively, within the flange on the lower end of equipment 22, and conduits 62 and 63 connect with the upper ends of passageways 60 and 61 to provide fluid lines for extension to valve controls for either admitting hydraulic fluid to or exhausting hydraulic fluid from the pressure chambers.

During locking and unlocking operations at an underwater level, the above-described pressure chambers provide the desired force relationships, wherein a greater force is usually required to unlock than to lock. Furthermore, as long as hydraulic fluid under pressure is introduced into chamber 56, while being exhausted from chamber 57, there will be a downwardly acting force on the sleeve to maintain the apparatus in locked position. However, as previously described, if pressure on the hydraulic fluid is lost as the member 25 is being lowered with the apparatus 20 and equipment 22 from a drilling platform several hundred feet above the water surface, the hydrostatic head of the hydraulic fluid in the fluid lines leading to the chambers 56 and 57 would create a resultant upward force which might raise the sleeve 41 and thereby prematurely unlock the apparatus. This upward force is counteracted by the force of a coil spring 64 acting between the enlarged upper end of the inner housing of body 21 and the upper end of sleeve 41 within chamber C. More particularly, while this spring is of such size and strength as to overcome this resultant upward force due to the hydrostatic head of the hydraulic fluid which might be expected at the heights from which the apparatus might be lowered to the water surface, it is not so strong as to provide a downward force which would be significant as compared with the force due to pressurized hydraulic fluid acting over the piston area in the larger chamber 57, and therefore does not interfere with the normal locking function of the apparatus.

As shown, the inner side of outer housing 21B closely surrounds sleeve 41 and coil spring 64, and the coil spring, sleeve and piston are arranged concentrically close to one another and inner housing 21A so as to reduce the cross-sectional area of the apparatus to a minimum, thereby facilitating its being raised and lowered within a restricted conduit. As shown, the upper end of outer housing 21B is sealed with respect to the upper enlarged end of inner housing 21A by means of a seal ring 65, the lower end of the outer housing is sealed with respect to skirt part 36 by means of a seal ring 66, and as previously described, the lower inner end of skirt part 37 fits closely about the outer diameter of lower member 25 when the apparatus 20 is supported thereon.

A non-corrosive fluid may be introduced into chamber C through a passageway 69 extending downwardly through the enlarged upper end of inner housing 21A generally parallel to the passageway 58 and 59. A passageway 70 in the flange on the lower end of equipment 22 is sealably connected to passageway 69, and a conduit 71 connects with the upper end of passageway 70 to provide a fluid line through which the non-corrosive fluid may be supplied. A passageway 72 in the lower end of skirt part 36 connects the chamber C with the exterior of the apparatus beneath the lower end of skirt part 36, so as to permit the lighter purge fluid to be circulated through the chamber for purging seawater therefrom.

The sliding fit of the lower inner surface of skirt part 36 maintains the apparatus centered with respect to the lower member. As shown, an intermediate portion of the inner surface of the lower skirt part is tapered upwardly and inwardly, and the upper portion thereof is generally aligned with the inner surface of upper skirt parts 37. Thus, as the apparatus is lowered onto the member 25, the tapered surface will guide the lower end of the skirt over the flange 24, thereby approximately aligning the gasket 30 with respect to the seat surface 30A on the flange 24. Closer alignment is provided as the gasket slides onto surface 30A and the lower surface of skirt part 36 moves over the outer diameter of the member 25.

The second-mentioned embodiment shown in FIGS. 7 to 12, and indicated in its entirety by reference character 80, includes a body 81 having an upper end connected to the lower end of a drill string 82, and a lower end adapted to be received within a bore 83 within a member 84 for releasable connection thereto. More particularly, body 81 of the apparatus includes a central housing 85 having a bore 86 therethrough, and a flanged head 87 disposed about the upper end of housing 85 for seating upon the upper end of member 84. When the body is so seated, a circumferentially discontinuous locking ring 88 carried thereby is disposed radially opposite a groove 89 in bore 83 through member 84 in position for releasably locking thereto.

More particularly, the flange of head 87 has a lower seating surface 90 for seating upon an upwardly facing seating surface 91 on the upper end of member 84. With the surfaces so seated, a conical locking surface 92 on the upper end of locking ring 88 is disposed for sliding over conical locking shoulder 93 on the upper end of groove 89 as the locking ring 88 is expanded outwardly from the position of FIG. 8 to the position of FIG. 7. In this manner, the seating surface 90 is pulled downwardly into tight seating engagement with seating surface 91 so as to lock the apparatus securely to the member 84.

In a typical installation, apparatus 80 would comprise a running tool suspended from drill pipe 82 for use in lowering member 84 in the form of a casing head into landed position with respect to an underwater wellhead (not shown). Alternatively, of course, the running tool could be used for retrieving and thus raising the casing head 84 from the wellhead. In either event, the running tool could be guided vertically by means of suitable guidelines extending upwardly from the wellhead base to the water level. The illustrated connection of the lower end of the drill string 82 to the threaded upper end of bore 86, would, if desired, permit the circulation of fluid through the drill string into the bore 83 of the casing head.

A sleeve 94 is carried about the intermediate portion of body housing 85 beneath the flange on head 87 for movement axially with respect thereto between a lower position forcing locking ring 88 outwardly to locking position (FIG. 7) and an upper position permitting the locking ring to move inwardly to unlocking position (FIG. 8). More particularly, the locking ring is supported on a flange 95 at the lower end of body housing 85, and has an inner cam surface 96 disposed about a complementary cam surface 97 on the sleeve 94. Thus, as the sleeve moves downwardly from its FIG. 8 to its FIG. 7 position, cam surface 97 wedges locking ring 88 outwardly into groove 89 so as to lock the apparatus with respect to wellhead member 84. On the other hand, upon upward movement of the sleeve from its FIG. 7 to its FIG. 8 position, cam surface 97 is lifted to permit the locking ring 88 to move inwardly to the unlocking position of FIG. 8. When the locking ring is retracted, as shown in FIG. 8, its outer diameter is substantially aligned with the outer diameters of sleeve 94 and flange 95, and thus slightly less than the circumferential portion of the bore 83 through member 84 above groove 89, so as to permit the retracted locking ring to move into and out of a position radially opposite the groove 89.

Since, as compared with the locking ring of the first embodiment of the invention, locking ring 88 is so constructed as to normally assume a retracted position, its opposie ends are spaced a minimum circumferential distance apart when in unlocking position, as shown in FIG. 11. Then, as the locking ring is expanded circumferentially to the locking position of FIG. 7, its opposite discontinuous ends are moved a maximum distance apart, as shown in FIG. 9. It may be found, however, that, as described in connection with the first embodiment, locking surface 92 of locking ring 88 may become stuck to the locking shoulder 93 against which it is tightly wedged, so that its tendency to retract to unlocking position, upon lifting the sleeve 94, is not sufficient to break these surfaces apart.

In accordance with this second embodiment of the invention, a T-shaped member 98 is carried on the outer side of sleeve 94 in position to move between and draw the ends of the locking ring together, and thereby release the conical locking surface on the locking ring from its tight engagement with the locking shoulder, in the event the ring is stuck in locking position. More particularly, and as in the case of the first embodiment, this engagement of the T-shaped member 98 with the discontinuous ends of the locking ring is caused to occur during initial upward movement of the sleeve first from the position of FIG. 7 to the position of FIG. 8.

Thus, as shown in each of FIGS. 9 to 11, each end of locking ring 88 is provided with a flange 99 adjacent its inner circumference, and an outwardly facing surface 100 on the flange which is flared to provide an inwardly facing component thereon. As also shown in FIGS. 9 to 11 as well as in FIG. 12, T-shaped member 98 includes a vertical rib 101 which is secured by bolt 102 to the cam surface 97 of the sleeve 94, and a pair of flanges 103 each extending from an opposite side of the rib. As shown, each flange overlaps an adjacent flange on an end of the locking ring 88, and has an inner surface 104 which is flared to be an inwardly facing component which is substantially parallel to the flange surface 100.

With sleeve 94 lowered to move the locking ring 88 to the locking position of FIG. 7, the outer ends of flanges 103 are spaced from the adjacent ends of the locking ring 88, the outer ends of flanges 99 are spaced from the adjacent sides of rib 101 of member 98, and surfaces 100 and 104 on the flanges of the member and ends of the ring are radially spaced a slight distance from one another. In the event the locking ring is stuck, initial upward movement of sleeve 94 will permit cam surface 97 thereon to move away from engagement with the inner surface 96 of the locking ring. As indicated in FIG. 10, this movement of cam surface 97 away from locking ring surface 96 will continue until flange surfaces 104 move into engagement with flange surfaces 100. At this time, continued upward movement of sleeve 94, which in turn continues to move T-shaped member 98 in an upward direction, will cause the flange surfaces 104 to exert a circumferential force on the flange surfaces 100 so as to draw flanges 99, and thus the opposite ends of the locking ring 88, toward one another.

Only a small amount of movement of the ends of the locking ring toward one another is necessary to break the frictional contact between the locking ring and the locking shoulder of the wellhead member. thus, as indicated in FIG. 11, the inner surface 96 of the locking ring is free to move toward its normal position and thus into engagement with cam surface 97 about the sleeve 94, which, of course, pulls the surfaces 100 on flanges 99 radially inwardly away from the surfaces 104 on flanges 103. In any event, however, the outer surface of the T-shaped member 98 is generally aligned with the outer diameter of the retracted locking ring 88, as shown in FIG. 11, so that the locking ring and the T-shaped member are free to move upwardly through the bore 83 of the wellhead member above the groove 89. As in the case of the first-mentioned embodiment, member 98 is at all stages of movement of the sleeve 94 disposed between the discontinuous ends of the locking ring 88.

The sleeve 94 is normally urged to its lower locking position by means of a rubber spring 105 disposed between its upper end and the lower side of the flange of head 87. As shown, each such spring comprises a hollow sleeve of rubber surrounding a pin 106 extending upwardly from sleeve 94 through a guide hole 107 in the flanged head.

The body housing 85 includes an uppermost diameter portion 108, an intermediate diameter portion 109, and a lowermost diameter portion 110, each of successively larger diameter. The flanged head 87 includes a lower tubular portion 112 which is disposed about the uppermost diameter portion 108 and sealed with respect thereto by a seal ring 108a. Tubular portion 112 is seated upon a shoulder of the housing 85 which connects the diameter portions 108 and 109, and a ring 113 is threadedly connected to the upper end of housing 85 so as to bear against a tapered shoulder on the inner upper corner of head 87 so as to hold it in seated position. Of course, upon removal of the ring 113, and lifting of the head 87, the piston and the rubber springs 105 may be removed from about the body housing 85.

A piston 111 on the inner side of sleeve 94 is slidable over the diameter portion 109, the upper end of the sleeve about the piston being slidable over diameter 112A of lower tubular portion 112 of head 87, and the lower end of the sleeve beneath the piston being slidable over diameter portion 110. The piston has a seal ring 111a slidable over diameter portion 109, the lower end of sleeve 94 is slidable over a seal ring 110a carried on diameter portion 110, the upper end of the sleeve is slidable over a seal ring 108b carried about the tubular portion 112A of head 87.

As will be understood from the foregoing, an upper fluid pressure chamber is formed between the upper end of the piston 111 and the lower end of portion 112, and a lower fluid pressure chamber is formed between the lower end of piston 111 and a shoulder on the housing 85 connecting diameter portions 109 and 110. More particularly, the diameter 110 is of greater radial extent than the outer diameter of portion 112, so that the effective pressure area on the piston in the lower chamber is larger than that in the upper chamber. Furthermore, a passageway 115 is formed in the body housing 85 for conducting hydraulic pressure to and from the upper chamber, and a passageway 116 is formed therein for conducting hydraulic fluid to and from the lower pressure chamber. Due to the effective pressure area relationship above described, the sleeve 94 may be urged in unlocking direction with greater force than it is urged in the locking direction. The hydraulic fluid is of course conducted to and from passageways 115 and 116 through conduits connecting with their upper ends, as shown in FIGS. 7 and 8, and leading to operating pressure sources at remote locations.

As described in connection with the first embodiment of the invention, there will be a downwardly acting force on the sleeve to maintain the apparatus in locked position as long as operating fluid under pressure is introduced into the upper chamber while being exhausted from the lower chamber. However, if the operating pressure is lost for any reason, the hydrostatic head of the hydaulic fluid in the fluid lines leading to the upper and lower chambers might create a resultant upward force which could cause the sleeve 94 to be prematurely raised. This upward force is, of course, counteracted by the force of the rubber springs 105 which, while being of such size and strength as to overcome this resultant upward force to the hydrostatic head of the hydaulic fluid, might not be so strong as to provide a downward force which would be significant in opposing the upward force required to lift the sleeve 94 in an unlocking direction.

From the foregoing it will be seen that this invention is one wall adapted to attain all of the ends and objects herein above set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the present invention without departing from the scope thereof, it is to be understood that all matter herein set forth or shown in the accompanying drawings is to be interpreted as illustrative and not in a limiting sense.

The invention having been described, what is claimed is:

1. Apparatus for releasably connecting with one end of a member having a seating surface which faces toward its one end and a conical locking shoulder which faces away from its one end, said apparatus comprising a body having a seating surface engageable with the seating surface on the member, a circumferentially discontinuous locking ring having a conical locking surface carried by the body which is circumferentially expandable and contractible between a first normally assumed circumferential position in which it may be moved past a portion of the member so as to dispose said locking surface radially opposite the locking shoulder on said member, as said seating surfaces are engaged, and a second circumferential position in which said conical locking surface slidably engages the conical locking shoulder on said member, so as to draw said seating surfaces into tight engagement, remotely operable means mounted on the body for movement in one direction to force the locking ring to its second position and in an opposite direction to permit the locking ring to move to its first position, and means on said remotely operable means for engaging between surfaces on the discontinuous ends of said locking ring so as to force said locking ring out of its second position, and thereby permit it to move to its first position in the event the conical locking surface sticks to the conical locking shoulder as said remotely operable means moves in said opposite direction.

2. Apparatus of the character defined in claim 1, wherein said portion is on the outer side of said member, said body includes an inner portion movable over the outer portion of said member, and said locking ring is carried by the inner portion of the body for movement between a normally assumed expanded position and a contracted locking position.

3. Apparatus of the character defined in claim 1, wherein the member has a bore therein and said portion is on the bore, said body includes an outer portion movable into the inner portion of said member, and said locking ring is carried by the outer portion of the body for movement between a normally assumed contracted position and an expanded locking position.

4. Apparatus for releasably connecting with a member having a flange about one end, a seating surface on the side of the flange which faces toward the one end of the member, and a conical locking shoulder on the other side of the flange which faces away from said one end, said apparatus comprising a body having a seating surface engageable with the seating surface on said flange, a circumferentially discontinuous locking ring having a conical locking surface carried on the body which is circumferentially expandable and contractible between a normally assumed, circumferentially expanded position in which it may be moved over the outer edge of the flange so as to dispose the conical locking surface of the locking ring radially opposite the locking shoulder on the flange, as the seating surfaces are engaged, and a circumferentially contracted position in which said conical locking surface slidably enages said conical locking shoulder on the flange so as to draw said seating surfaces into tight engagement, remotely operable means mounted on the body for movement in one direction to force the locking ring inwardly to contracted position and in an opposite direction to permit the locking ring to move outwardly to expanded position, and means on said remotely operable means for engaging between surfaces on the discontinuous ends of said locking ring so as to spread them and thereby permit said locking ring to expand to unlocking position in the event the conical locking surface sticks to the conical locking shoulder as said remotely operable means moves in said opposite direction.

5. Apparatus of the character defined in claim 4, wherein the ends of said locking ring have cam surfaces which converge in said opposite direction.

6. Apparatus for releasably connecting with a member having a flange about one end, a seating surface on the side of the flange which faces toward the one end of the member, and a conical locking shoulder on the other side of the flange which faces away from said one end, said apparatus comprising a body having a seating surface engageable with the sealing surface on said flange, a circumferentially discontinuous locking ring having a conical locking surface, means on the body carrying the locking arm for radial movement between a normally assumed, circumferentially expanded position in which it may be moved over the outer edge of the flange so as to dispose the conical locking surface of the locking ring radially opposite the locking shoulder on the flange, as the seating surfaces are engaged, and a circumferentially contracted position in which said conical locking surface slidably engages said conical locking shoulder on the flange so as to draw said seating surfaces into tight engagement, a sleeve surrounding the locking ring and mounted on the body for movement in opposite directions axially of the body for forcing the locking ring inwardly to contracted position, in response to movement in one axial direction, and permitting the locking ring to move outwardly to expanded position, in response to movement in the opposite axial direction, remotely operable means for so moving the sleeve, and a pin on said sleeve for engaging between surfaces on the discontinuous ends of said locking ring so as to spread them and thereby permit said locking ring to expand to unlocking position in the event the conical locking surface sticks to the conical locking shoulder, as said sleeve moves in said opposite direction.

7. Apparatus of the character defined in claim 6, wherein at least a portion of said pin remains between the discontinuous ends of said locking ring during axial movement of said sleeve.

8. Apparatus of the character defined in claim 6, wherein said remotely operable means comprises piston means on the sleeve sealably slidable over the body to define annular pressure chambers between them, and passageways in the body connecting with the chambers to permit fluid under pressure to be selectively introduced into or withdrawn from each.

9. Apparatus for releasably connecting with a member having a bore in one end, a seating surface which faces toward the one end of the member, and a conical locking shoulder on the bore which faces away from said one end, said apparatus comprising a body having a seating surface engageable with the seating surface on said bore, a circumferentially discontinuous locking ring having a conical locking surface carried on the body which is circumferentially expandible and contractible between a normally assumed, circumferentially contracted position in which it may be moved into the bore so as to dispose the conical locking surface of the locking ring radially opposite the locking shoulder, as the seating surfaces are engaged, and a circumferentially expanded position in which said conical locking surface slidably engages said conical locking shoulder on the bore so as to draw said seating surfaces into tight engagement, remotely operable means mounted on the body for movement in one direction to force the locking ring outwardly to expanded position and in an opposite direction to permit the locking ring to move inwardly to contracted position, and means on said remotely operable means for engaging between surfaces on the discontinuous ends of said locking ring so as to draw them toward one another and thereby permit said locking ring to contract to unlocking position in the event the locking surface sticks to the locking shoulder, as said remotely operable means moves in said opposite direction.

10. Apparatus for releasably connecting with a member having a bore in one end, a seating surface which faces toward the one end of the member, and a conical locking shoulder on the bore which faces away from said one end, said apparatus comprising a body having a seating surface engageable with the seating surface on said bore, a circumferentially discontinuous locking ring having a conical locking surface, means on the body carrying the locking ring for radial movement between a normally assumed, circumferentially contracted position in which it may be moved into the bore so as to dispose the conical locking surface of the locking ring radially opposite the locking shoulder, as the seating surfaces are engaged, and a circumferentially expanded position in which said conical locking surface slidably engages said conical locking shoulder so as to draw said seating surfaces into tight engagement, a sleeve within the locking ring and mounted on the body for movement in opposite directions axially of the body for forcing the locking ring outwardly to expanded position, in response to movement in one axial direction, and permitting the locking ring to move inwardly to contracted position, in response to movement in the opposite axial direction, remotely operable means for so moving the sleeve, and a T-shaped member on said sleeve having flanges for overlapping flanges on the discontinuous ends of said locking ring so as to draw them toward one another and thereby permit said locking ring to contract to unlocking position in the event the conical locking surface sticks to the conical locking shoulder as said sleeve moves in said opposite direction.

11. Apparatus of the character defined in claim 10, wherein at least a portion of said T-shaped member remains between the discontinuous ends of said locking ring during axial movement of said sleeve.

12. Apparatus of the character defined in claim 10, wherein said remotely operable means comprises piston means on the sleeve sealably slidable over the body to define annular pressure chambers between them, and passageways in the body connecting with the chambers to permit fluid under pressure to be selectively introduced into or withdrawn from each.

13. Apparatus for releasably connecting with one end of a member having a seating surface which faces toward its one end and a conical locking shoulder which faces away from its one end, said apparatus comprising a body having a seating surface engageable with the seating surface on the member, a locking means carried by the body for movement between a first circumferential position in which it may be moved past the circumferential portion of the member so as to dispose the locking means radially opposite the locking shoulder on said member, as said seating surfaces are engaged, and a second circumferential position in which it slidably engages the locking shoulder so as to draw said seating surfaces into tight engagement, a sleeve carried by the body for axial movement in opposite directions with respect thereto and slidable over the locking means for forcing the locking means to its second position, as said sleeve moves in one axial direction, and permitting the locking means to move to its first position, in response to movement of said sleeve in the opposite direction, means for so moving the sleeve including piston means on the sleeve sealably slidable along the body to define first and second annular pressure chambers between them into which hydraulic fluid may be introduced or from which hydraulic fluid may be exhausted for moving said sleeve in locking and unlocking directions, respectively, the second pressure responsive area being larger than the first, passageways in the body connecting with the chambers to permit hydraulic fluid under pressure to be selectively introduced into or withdrawn from each, and spring means urging said sleeve to locking position.

* * * * *